(12) United States Patent
Hin et al.

(10) Patent No.: US 8,505,565 B2
(45) Date of Patent: Aug. 13, 2013

(54) DEVICES FOR TREATING, SENSING, OR OTHERWISE ACTING UPON FLUID

(75) Inventors: Raymond Albert Hin, Kilsyth (AU); Craig Andrews, Kirribilli (AU)

(73) Assignee: Zodiac Pool Care Europe (FR)

( * ) Notice: Subject to any disclaimer, the term of this patent is extended or adjusted under 35 U.S.C. 154(b) by 151 days.

(21) Appl. No.: 12/797,701

(22) Filed: Jun. 10, 2010

(65) Prior Publication Data

US 2010/0313964 A1 Dec. 16, 2010

Related U.S. Application Data

(60) Provisional application No. 61/268,219, filed on Jun. 10, 2009.

(51) Int. Cl.
*G05D 7/00* (2006.01)
*F17D 1/00* (2006.01)

(52) U.S. Cl.
USPC ............ 137/1; 137/268; 137/561 R; 422/278; 422/282

(58) Field of Classification Search
USPC .............. 137/268, 15.01, 1, 561 R; 422/261, 422/264, 282, 278, 279; 73/202, 204.21
See application file for complete search history.

(56) References Cited

U.S. PATENT DOCUMENTS

| | | | | |
|---|---|---|---|---|
| 1,205,213 A | * | 11/1916 | Carlson | 248/99 |
| 2,215,000 A | * | 9/1940 | Isenberg | 422/278 |
| 4,873,727 A | * | 10/1989 | Homan | 4/226.1 |
| 5,595,163 A | * | 1/1997 | Nogi et al. | 73/204.21 |
| 5,660,802 A | * | 8/1997 | Archer et al. | 137/268 |
| 5,810,999 A | | 9/1998 | Bachand et al. | |
| 5,855,777 A | | 1/1999 | Bachand et al. | |
| 5,993,753 A | | 11/1999 | Davidson | |
| 6,267,886 B1 | | 7/2001 | Brandreth | |
| 6,680,026 B1 | | 1/2004 | Denkewicz et al. | |
| 7,211,176 B2 | | 5/2007 | Hin et al. | |
| 7,419,589 B2 | * | 9/2008 | Eserkaln et al. | 137/268 |

(Continued)

FOREIGN PATENT DOCUMENTS

| | | |
|---|---|---|
| EP | 1468966 | 10/2004 |
| WO | WO-2006110799 | 10/2006 |
| WO | WO-2010015924 | 2/2010 |

OTHER PUBLICATIONS

International Search Report and Written Opinion in related Application No. PCT/IB2010/001408 dated Dec. 20, 2010.

(Continued)

*Primary Examiner* — Kevin Lee
(74) *Attorney, Agent, or Firm* — Dean W. Russell; Kilpatrick Townsend & Stockton LLP

(57) ABSTRACT

Treating, sensing, diverting, measuring, and collecting devices for fluid such as water are described. When designed for use as chlorinators, the devices may divert water flowing in conduits into the devices for treatment and subsequent return to the flow stream. A return tube of the device may be designed to create vortex action, using a pressure differential to evacuate treated water from the device back into the conduit. When designed for use as feeders for supplying acid or other material to flowing water, the devices may include one or more channels communicating between the material and the flowing water. When designed for use as flow sensors or otherwise, the devices may include objects acted upon by flowing water to indicate that water indeed is flowing. Yet other sensors may be utilized to determine characteristics of water passing through the conduits.

6 Claims, 9 Drawing Sheets

(56) References Cited

U.S. PATENT DOCUMENTS

| | | | | |
|---|---|---|---|---|
| 7,604,018 B2* | 10/2009 | King et al. | | 137/268 |
| 7,879,208 B2 | 2/2011 | Wu et al. | | |
| 2002/0153043 A1* | 10/2002 | Hillyard | | 137/268 |
| 2006/0266682 A1* | 11/2006 | Kennedy et al. | | 210/198.1 |

OTHER PUBLICATIONS

Extended Search Report dated Sep. 10, 2012 in European Application No. EP12178639.

\* cited by examiner

DEVICES FOR TREATING, SENSING, OR OTHERWISE ACTING UPON FLUID

REFERENCE TO PROVISIONAL APPLICATION

This application is based on, claims priority to, and hereby refers to U.S. Provisional Patent Application Ser. No. 61/268,219, filed Jun. 10, 2009, entitled "Fluid Treatment and Sensing Devices," the entire contents of which are incorporated herein by this reference.

FIELD OF THE INVENTION

This invention relates to fluid treatment, sensing, diversion, measuring, sampling, and collection devices and more particularly, although not necessarily exclusively, to chlorinators, chemical feeders, sensors, and other devices for use with circulating water utilized in swimming pools, spas, hot tubs, or other water-containing vessels.

BACKGROUND OF THE INVENTION

U.S. Pat. No. 6,680,026 to Denkewicz, et al., discloses water-purification equipment useful especially in connection with swimming pools, spas, and hot tubs, where water recirculates. The equipment may provide "plug-in" forms of fluid-flow diverters "designed to penetrate, or fill, openings intermediate remote ends of conduits." See Denkewitz, col. 2, 11. 3-4. As indicated in the Denkewicz patent:

> Embodiments of the invention contemplate diverting flowing fluid to purification equipment formed about or otherwise connected to such diverters, permitting diverted water to be purified before rejoining the flow. The . . . circulating nature of the water permits more of its volume ultimately to be diverted into the equipment for purification.

See id., 11. 13-15.

Positioned within the equipment of the Denkewicz patent is water purification media such as "mineral-based pellets or other objects of silver-, zinc-, or copper-containing material." However, other media alternatively may be used therein. According to the Denkewicz patent, "[c]hlorine or other chemicals which may be dissolved or contacted by the water being diverted are among suitable alternatives." See id., 11. 57-59.

International (Patent) Publication No. WO 2006/110799 of Kennnedy, et al. [sic Kennedy, et al.] details additional equipment used to divert flowing fluid for purification. Diverted fluid may be treated by, for example, a salt water chlorinator (SWC) having an electrolytic cell. Treated water is then returned to the main flow stream via a series of fins, with the overall configuration of the equipment being designed to, among other things, cause the bulk of fluid experiencing pressure spikes to remain in the conduit. See, e.g., Kennedy, p. 12, 11. 4-10. Accordingly, housings detailed in the Kennedy publication may be "fabricated from less pressure-resistant materials, and need not be engineered in the same way as other pressure vessels." See id., 11. 13-14. The contents of the Denkewicz patent and the Kennedy publication are hereby incorporated herein in their entireties by this reference.

SUMMARY OF THE INVENTION

The present invention provides additional equipment in the style of the diverters of the Denkewicz patent and the Kennedy publication. In some versions intended mainly for use as chlorinators, devices of the invention may divert water flowing in conduits into the devices for treatment and subsequent return to the flow stream. Separate, spaced inlet and return tubes may be utilized within the conduits. The return tube of the device additionally may be designed to create vortex action, using a pressure differential to evacuate treated water from the device back into the conduit.

Additional features of the invention may include a housing, upper and lower sections of a clamp, and a threaded locking collar. The sections preferably are snap-fit together about a conduit, with the locking collar thereafter engaging the lower section to enhance a fluid seal. By permitting the sections to connect via snap-fitting, the invention avoids any need to utilize secondary fasteners.

Another optional feature of the invention is inclusion of an adaptor sleeve. The sleeve especially is useful when the main conduit to which the device is to be connected is smaller than a nominal diameter. In these instances, the sleeve may be positioned between the upper and lower housing sections to reduce the spacing between the two. Finally, gas removal from the housing also may occur.

Alternate versions of devices of the present invention may treat water other than through chlorination; these versions additionally (or alternatively) may sense characteristics of the water as well. These versions typically replace one type of housing with a caddy or other type of housing functioning as an interface between other equipment and water flowing through the conduit. The caddies preferably include multiple ports allowing access to the conduit therethrough. Other versions allow measurements to be made under low-flow conditions, collection of water samples, feeding of chemicals into the circulating water, or separation of gaseous material from the water.

In some embodiments of the invention, a feed tube extends from one port into the conduit. The feed tube may be positioned within the return tube in some configurations. Alternatively, it may replace the return tube or extend into or connect to a breather outflow (feeder) port. In any situation, however, acid or other chemicals may exit the feed tube into the flowing water for treatment thereof.

Other embodiments of the invention position an arm or other mechanical (or electrical or electromechanical) device within, preferably, the inlet tube. Force of water flowing through the conduit causes the arm to move, actuating an electrical switch or other means to indicate the presence or force of the flowing water. By contrast, absence of flowing water does not cause movement of the arm, thus indicating that absence. Further embodiments allow other sensors (e.g., oxidation-reduction potential [ORP], pH, etc.) or measurement devices to help ascertain other characteristics of water passing through the conduit.

It thus is an optional, non-exclusive object of the present invention to provide innovative fluid treatment, sensing, diversion, re-diversion, sampling, measuring, or collection devices.

It is, moreover, an optional, non-exclusive object of the present invention to provide "plug-in" types of equipment particularly useful for, e.g., treating and sensing aspects of circulating water.

It is a further optional, non-exclusive object of the present invention to provide devices in which a return tube creates vortex action to evacuate fluid from the devices and into conduits.

It is also optional, non-exclusive object of the present invention to provide devices in which conduit clamps do not require secondary fasteners.

It is another an optional, non-exclusive object of the present invention to provide devices in which a locking collar may be used to enhance the integrity of a fluid seal between the clamp and the conduit.

It is, furthermore, an optional, non-exclusive object of the present invention to provide devices in which an adaptor sleeve may facilitate accommodating smaller conduits when the devices are attached.

It additionally is an optional, non-exclusive object of the present invention to provide devices in which an interface caddy may be substituted for a chlorinator housing (and vice-versa).

It is a further optional, non-exclusive object of the present invention to provide devices in which one or more chemicals may be communicated, via the caddy, to fluid flowing within a conduit.

It is, moreover, an optional, non-exclusive object of the present invention to provide devices in which flowing fluid may actuate a switch or other device indicating its presence in the conduit.

It is yet another optional, non-exclusive object of the present invention to provide devices in which sensors may be employed to help determine one or more characteristics of the fluid.

Other objects, features, and advantages of the present invention will be apparent to those skilled in the relevant fields with reference to the remaining text and the drawings of this application.

DETAILED DESCRIPTION

Figure 1A:
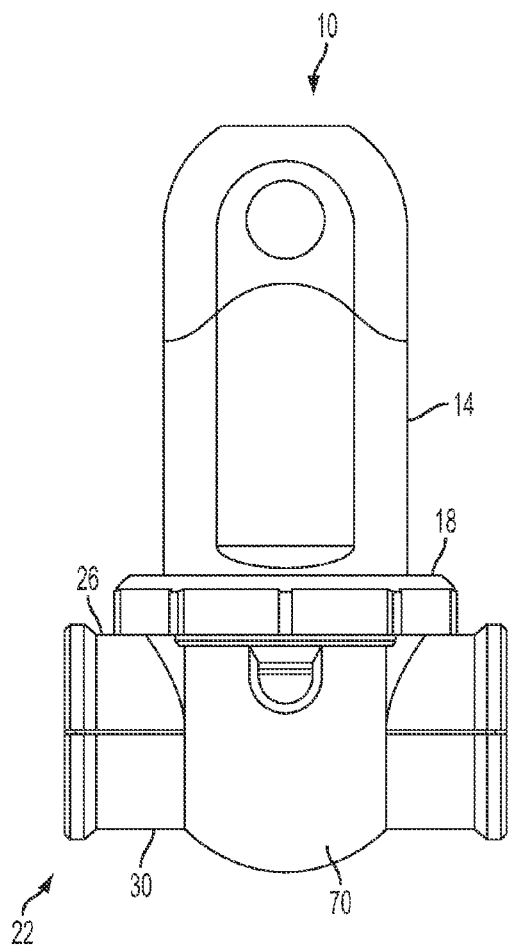
FIGS. 1A-1B are elevational views of exemplary equipment of the present invention.
Figure 1B:
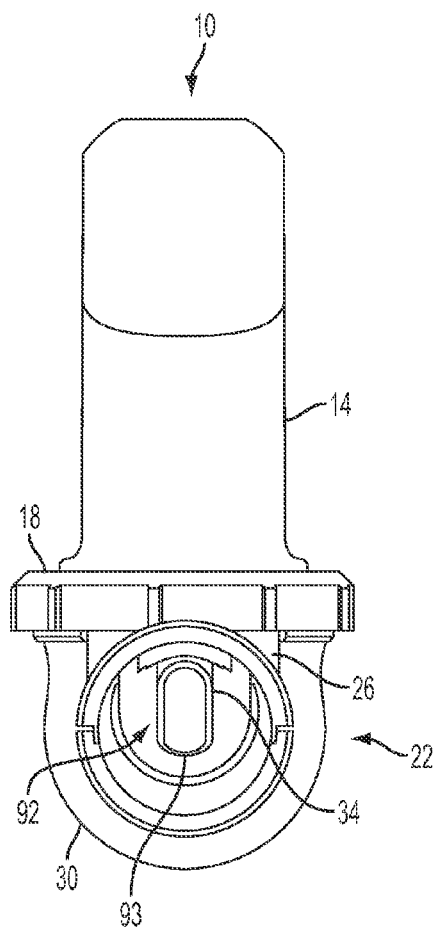
Figure 2:
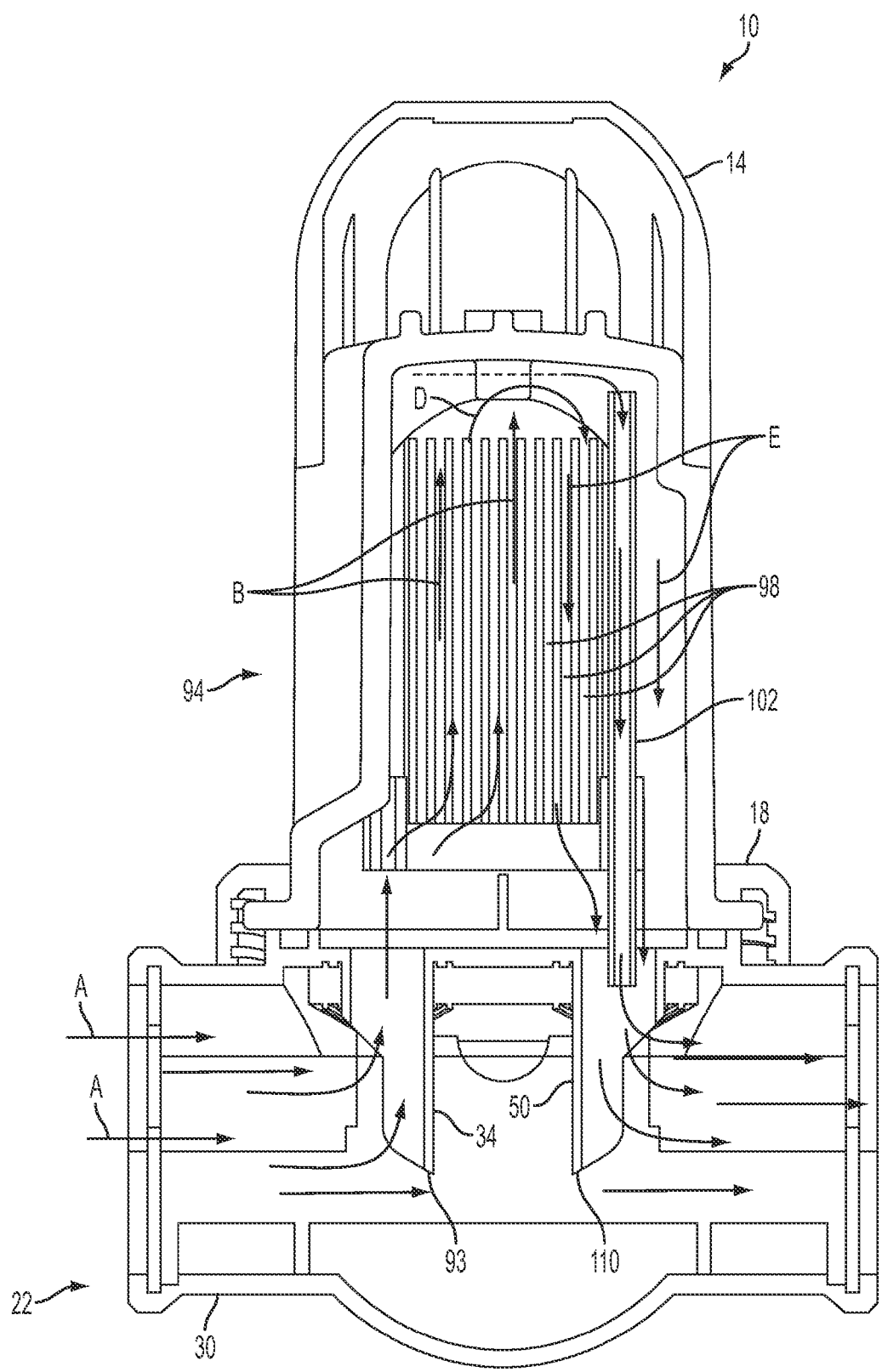
FIG. 2 is a cross-sectional view of the equipment of FIGS. 1A-1B.
Figure 3:
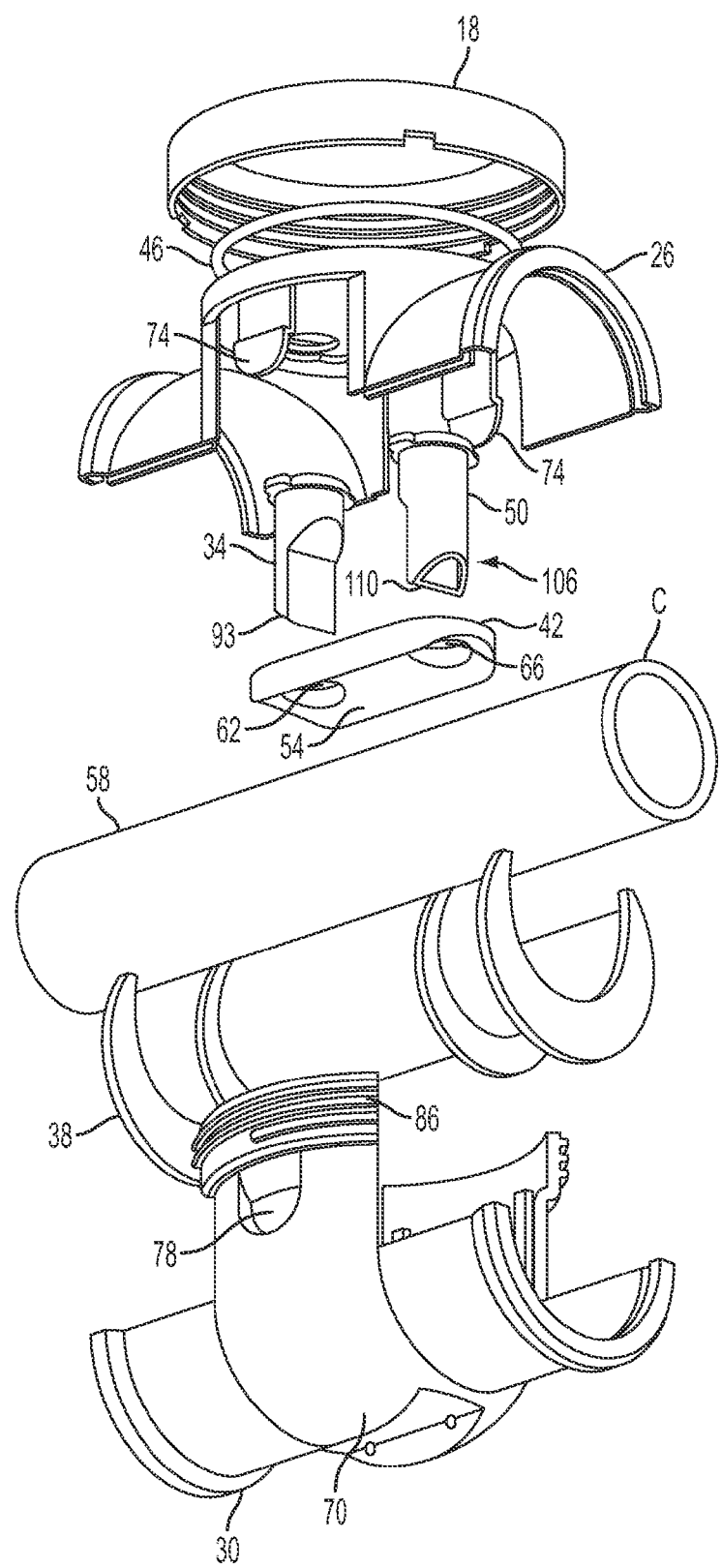
FIG. 3 is an exploded view of portions of the equipment of FIGS. 1A-1B shown in connection with a fluid conduit to which the equipment may attach.
Figure 4:
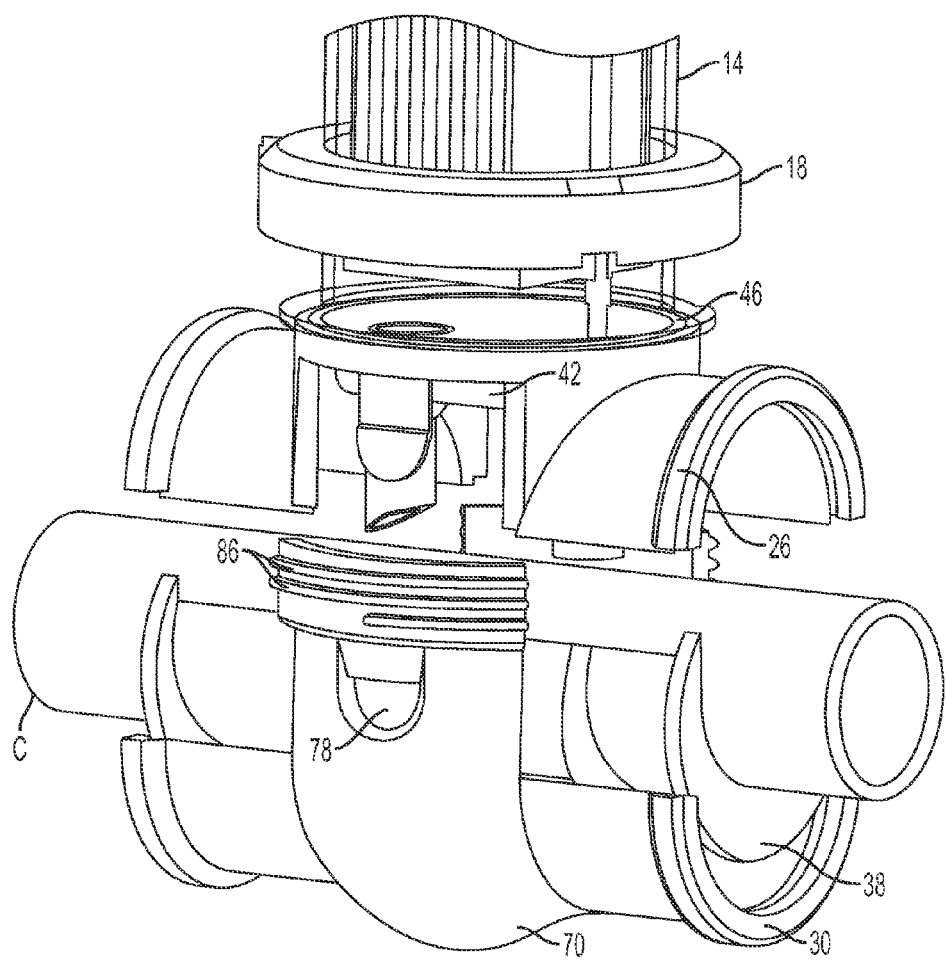
FIG. 4 is another exploded view of portions of the equipment of FIGS. 1A-1B shown in connection with the fluid conduit of FIG. 3.

Depicted in FIGS. 1A-2 is exemplary equipment 10 of the present invention. Equipment 10 preferably constitutes a fluid treatment device. Also illustrated in FIGS. 3-4 is conduit C to which equipment 10 may attach. Conduit C preferably conveys liquid from one location to another. Even more preferably, conduit C conveys water circulating to or from a swimming pool, spa, hot tub, or similar vessel.

Illustrated in FIGS. 1A-1B and various of FIGS. 3-5B are components of equipment 10 including housing 14, locking collar 18, and clamp 22. Clamp 22 may comprise upper section 26 and lower section 30 and is designed to encircle, or otherwise surround, a portion of conduit C. Further, upper section 26 is configured to communicate with (i.e. plug-into) conduit C to permit fluid to flow thereto and therefrom. FIG. 1B depicts inlet 34 through which fluid may flow from conduit C into housing 14 via upper section 26.

Additionally shown in FIGS. 3-4 is optional sleeve adaptor 38 as well as seal 42, o-ring 46, and outlet 50. Sleeve adaptor 38, if present, may be generally semi-cylindrically shaped and configured to nest in a similarly-shaped portion of lower section 30. Adaptor 38 is, in essence, a spacer, intended to fill any gap between conduit C and lower section 30 when the two are attached. Use of adaptor 38 renders equipment 10 more versatile, as it may accommodate conduit C of different diameters.

Seal 42 and o-ring 46 prevent, or at least reduce, fluid leakage between and from conduit C and equipment 10. Seal 42 preferably is an elongated object with concave lower surface 54 contacting outer surface 58 of conduit C. Seal 42 additionally may include two spaced openings 62 and 66, the former receiving inlet 34 and the latter receiving outlet 50. O-ring 46, by contrast, beneficially fits between locking collar 18 and upper section 26.

Figure 5A:
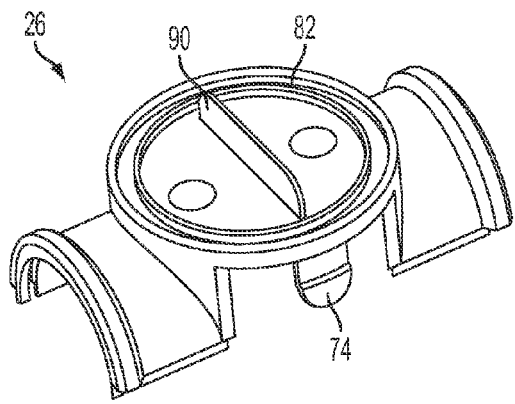
FIG. 5A is an isometric, bird's-eye view of an upper housing section of the equipment of FIGS. 1A-1B.
Figure 5B:
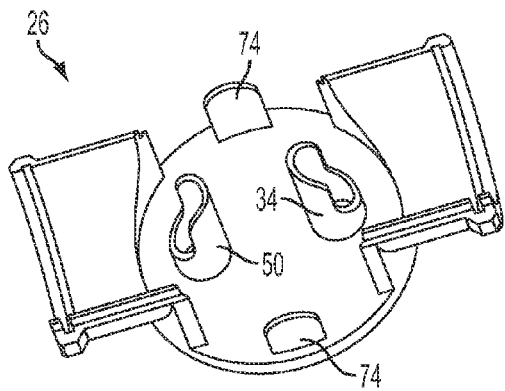
FIG. 5B is an isometric, worm's-eye view of an upper housing section of the equipment of FIGS. 1A-1B.

As depicted especially in FIG. 5B, spaced inlet 34 and outlet 50 preferably are generally tubular in shape and integral with upper section 26. They need not necessarily be so shaped or integrally formed with upper section 26, however. Instead, for example, inlet 34 and outlet 50 could engage or otherwise connect to corresponding portions of section 26.

To employ equipment 10, conduit C must include an opening in its upper wall. Such opening may be drilled or created in any other appropriate way. Advantageously, conduit C will include two openings, with the openings spaced and sized similar to spacing and sizing of inlet 34 and outlet 50 as well as spacing and sizing of openings 62 and 66 of seal 42. Although not presently preferred, conduit C could, for example, include only one opening shaped and sized similar to seal 42.

Lower section 30 may then be placed underneath conduit C with its saddle portion 70 opposite the upper wall openings of conduit C. (As noted earlier, adaptor 38 optionally may be employed as a spacer between conduit C and lower section 30.) Seal 42, by contrast, may be positioned in contact with the upper wall of conduit C so that fluid may communicate between the conduit C and openings 62 and 66. Upper section 26 may be positioned atop seal 42 so that inlet 34 extends into conduit C through opening 62 and outlet 50 extends into conduit C through opening 66. Upper section 26 beneficially includes one or more tabs 74 designed to engage apertures 78 of lower section 30 so as to connect (e.g. snap-fit) upper section 26 to lower section 30 about conduit C. Doing so forms clamp 22 and helps compress seal 42 against conduit C.

As shown in FIG. 5A, upper section 26 may include channel 82 in which o-ring 46 may be placed. Thereafter, internally-threaded collar 18 may engage threads 86 of saddle portion 70 of lower section 30 so as to push it toward upper section 26, further facilitating sealing of equipment 10 about conduit C. Collar 18 also connects housing 14 to upper section 26 as detailed in FIGS. 2 and 4.

Upper section 26 further may include baffle 90 positioned between inlet 34 and outlet 50. Baffle 90 assists in preventing fluid entering housing 14 via inlet 34 from immediately exiting the housing 14 via outlet 50. Although baffle 90 need not necessarily be present as part of upper section 26, its presence currently is preferred.

Once connected about conduit C, equipment 10 may function to sanitize, purify, or otherwise treat fluid (such as water) travelling through the conduit C. In use, pressurized fluid flows though conduit C in the direction of arrows A. As it does so, the fluid encounters inlet 34, with the pressure driving some of the fluid into the inlet 34 (while the remaining fluid continues to travel within conduit C). As depicted especially in FIGS. 1B, 2-3, and 5B, inlet 34 may include tapered end 92 whose trailing edge 93 extends farthest into conduit C. End 92 thus presents an open face to the flowing fluid, facilitating its entry into inlet 34. From inlet 34, fluid may then enter housing 14 in which treatment may occur.

Indeed, housing 14 may perform any desired type of fluid treatment. Preferably, however, housing 14 includes therein chlorinator 94, which more preferably is an SWC. Through operation of chlorinator 94, chlorine is added to water entering housing 14 via inlet 34 (i.e. hypochlorous acid is formed) before the water exits the housing 14 via outlet 50 to return to conduit C.

Illustrated in FIG. 2 using arrows B, D, and E is the major flow path of fluid within housing 14. As depicted, fluid flows initially upward, in the direction of arrows B (which is generally perpendicular to arrows A), through plates 98 of chlorinator 94. Under force of gravity, the fluid then travels generally in the direction of arrow D before flowing downward in the direction of arrows E. Note that some fluid flowing in the direction of arrows E is likely to travel again through plates 98, whereas other fluid is not. Regardless, however, all fluid flowing in the direction of arrows E may be received by outlet 50 for return to conduit C.

Produced additionally by salt-water chlorination is hydrogen (and other) gas, which beneficially may be introduced into the circulating water to avoid its undesired build-up within housing 14. Chlorinator 94 thus may include gas tube 102 extending from within housing 14 into outlet 50. Via tube 102 and outlet 50, gas such as hydrogen may be entrained with treated water exiting housing 14 and re-entering conduit C.

Similar to inlet 34, outlet 50 may include a tapered end 106 extending into conduit C. Unlike end 92 of inlet 34, however, end 106 opens opposite to the direction of fluid flow within the conduit C. Stated differently, end 106 opens opposite the direction indicated by arrows A, with its leading edge 110 extending farthest into conduit C. This configuration of end 106 allows the flowing fluid to create a lower-pressure area within outlet 50, creating vortex action facilitating removal of treated water from housing 14. Selecting a lesser diameter for tube 102 than for outlet 50 enhances ability of the lower-pressure region to remove gas from housing 14 too.

Figure 6:
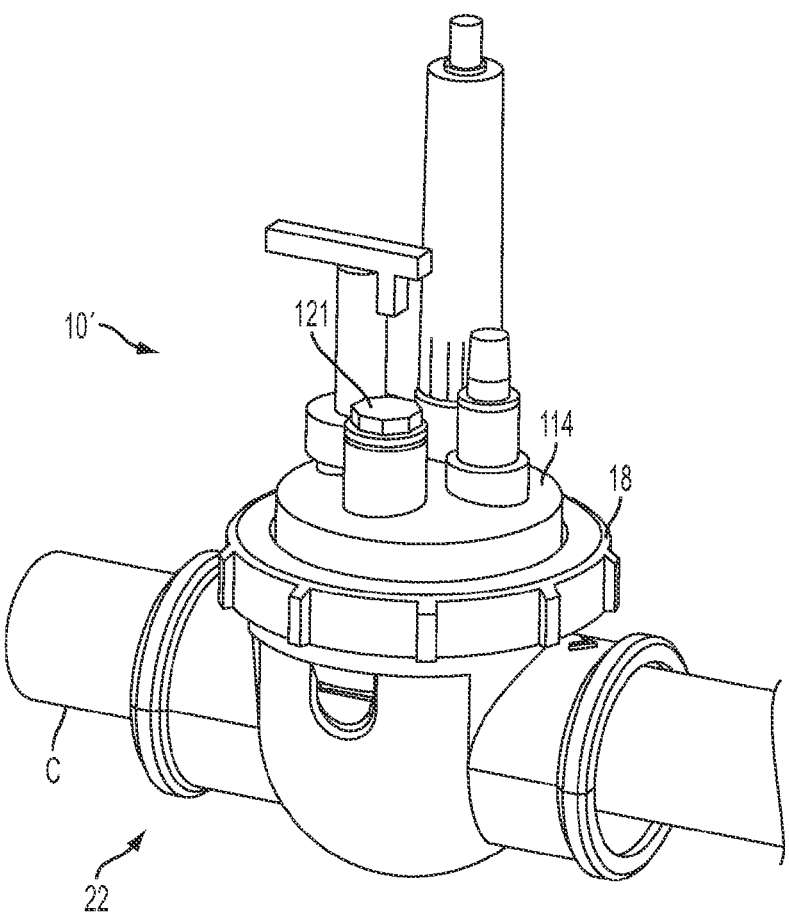
FIG. 6 is a perspective view of alternate exemplary equipment of the present invention.
Figure 7A:
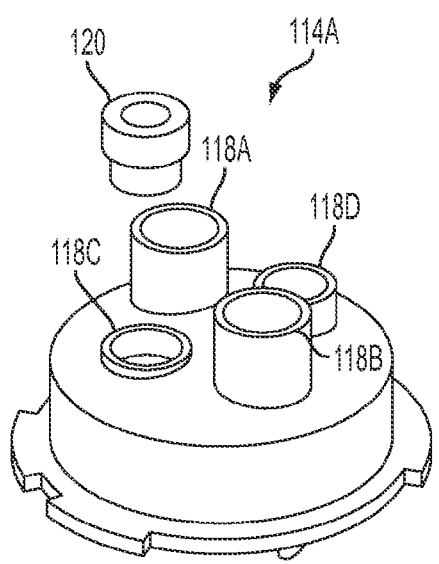
FIGS. 7A-D are various views of caddies useful as part of the equipment of FIG. 6.
Figure 7B:
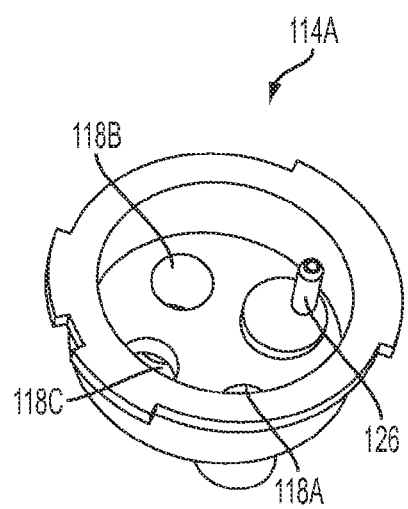
Figure 7C:
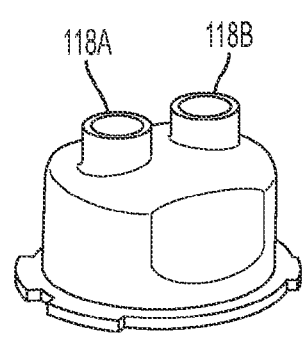
Figure 7D:
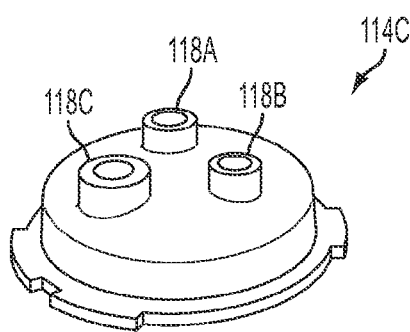

Depicted in FIG. 6 is exemplary equipment 10' of the present invention together with conduit C to which equipment 10' may attach. Equipment 10' may comprise any or all of locking collar 18, clamp 22, sleeve adaptor 38, seal, 42, o-ring 46, inlet 34, and outlet 50. Unlike equipment 10, however, equipment 10' preferably lacks housing 14, replacing housing 14 with caddy 114 (or any other suitable housing) instead. Caddy 114, in use, functions as an interface between various equipment and water (or other fluid) flowing within conduit C.

FIGS. 7A-D illustrate various examples of caddy 114. Caddy 114A, for example, includes four ports 118A-D, whereas caddies 114B and 114C include two (118A-B) and three (118A-C) ports, respectively. Those skilled in the relevant art will, of course, recognize that caddy 114 may comprise fewer than two or more than four ports 118 as appropriate or desired, however. Any of ports 118 additionally may be configured to receive adaptor 120 as needed or, if unused, to receive plug 121 (FIG. 6). Check valves or other items also may be received by any of ports 118.

Figure 8:
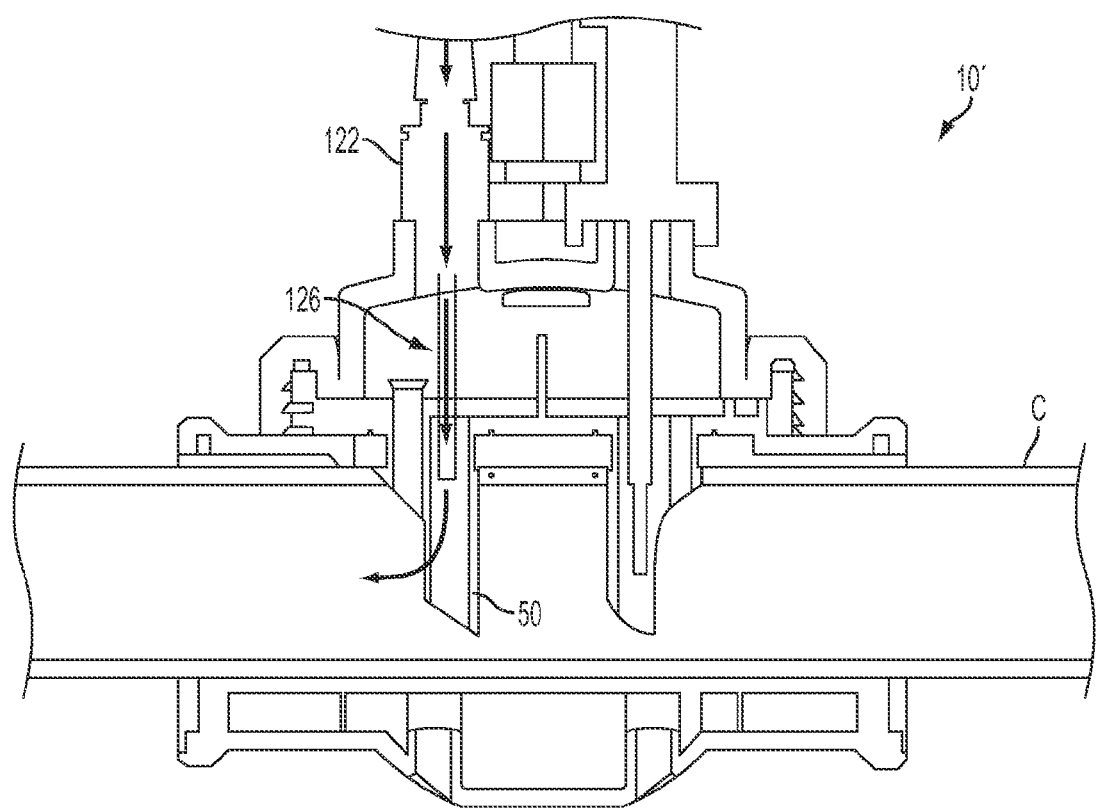
FIG. 8 is a cross-sectional view of equipment consistent with FIG. 6 showing an acid feed tube.

As shown in FIG. 8, feeder 122 may plug into or otherwise communicate with port 118D. Such communication allows acid to flow from a source thereof into outlet 50 for deposit into water within conduit C. In some embodiments of equipment 10', feeder 122 may comprise tube 126 positioned within outlet 50, although tube 126 need not necessarily be present. Alternatively, one or more chemicals other than acids (and in any of solid, liquid, or gaseous forms) may be supplied by feeder 122 or otherwise. Yet alternatively, an SWC or other device may constitute feeder 122.

Figure 9:
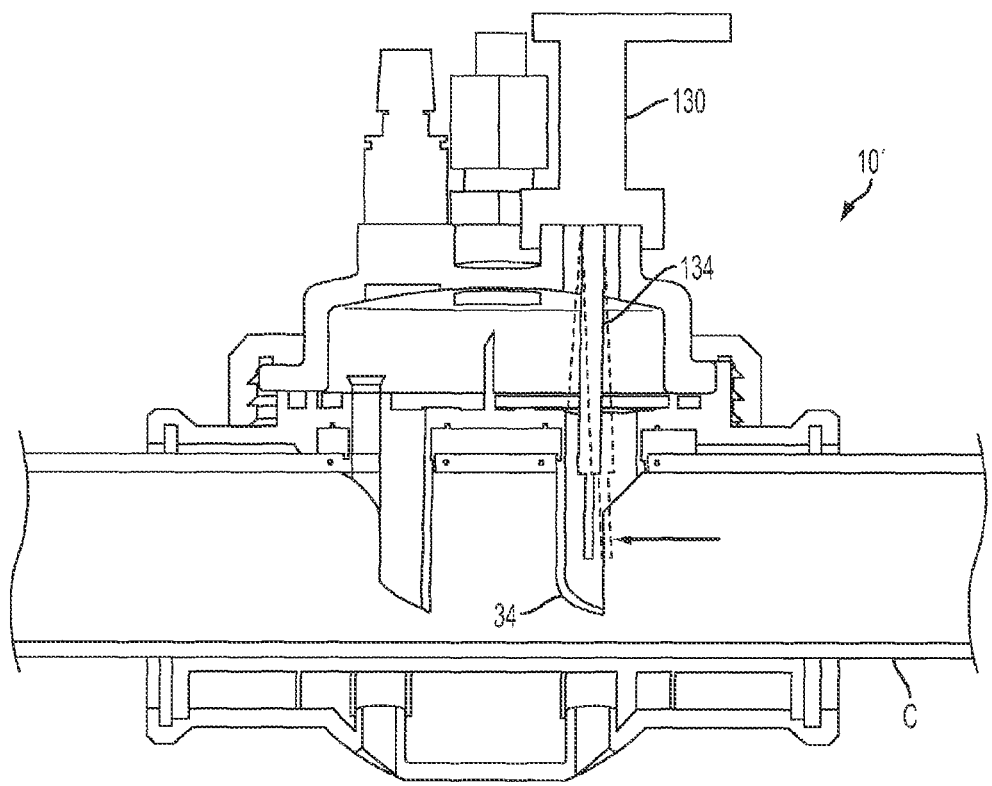
FIG. 9 is a cross-sectional view of equipment consistent with FIG. 6 showing a flow sensor.

FIG. 9 illustrates aspects of flow sensor 130 that may plug into or otherwise communicate with port 118C of caddy 114. Preferred versions of flow sensor 130 position pivoting arm 134 within inlet 34. Arm 134 normally assumes a first position absent fluid flowing through conduit C. However, whenever fluid flow through the conduit C exerts at least a predetermined amount of force on arm 134, the arm 134 pivots (or otherwise moves) to a second position. Movement of arm 134 to the second position changes the state of a switch or otherwise operates to indicate the presence of fluid flowing through the conduit C.

Figure 10A:
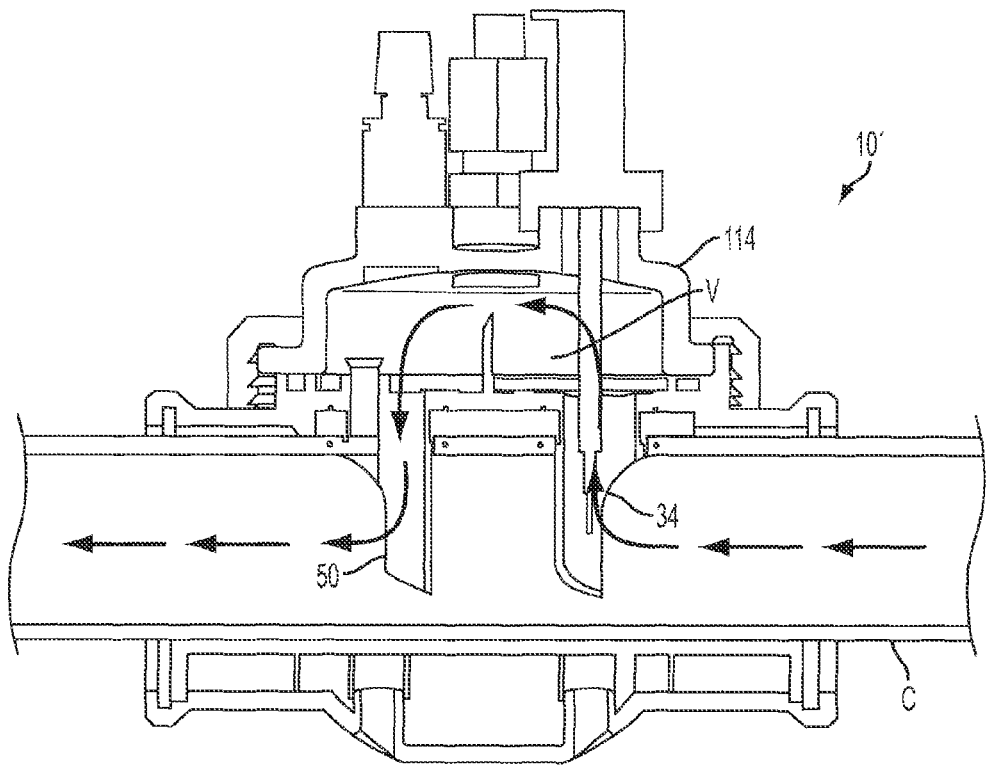
FIG. 10A is a cross-sectional view of equipment consistent with FIG. 6 showing a water flow path through the caddy.

Shown in FIG. 10A is that fluid may flow into and through volume V defined by caddy 114. In at least this respect caddy 114 may function like housing 14, in that fluid may enter caddy 114 via inlet 34, pass through volume V (at a rate less than the rate at which it passed through conduit C immediately prior to entering caddy 114), and then reenter conduit C via outlet 50. This flow path through caddy 114 may occur regardless of which ports 118A-D are in use, although any unused ports should be closed—or a caddy with fewer ports selected—to ensure fluid does not exit caddy 114 through any unused port. This path thus may provide a low-flow region in which water (or characteristics thereof) may be treated, sensed, measured, collected, sampled, re-diverted, or otherwise acted upon.

Figure 10B:
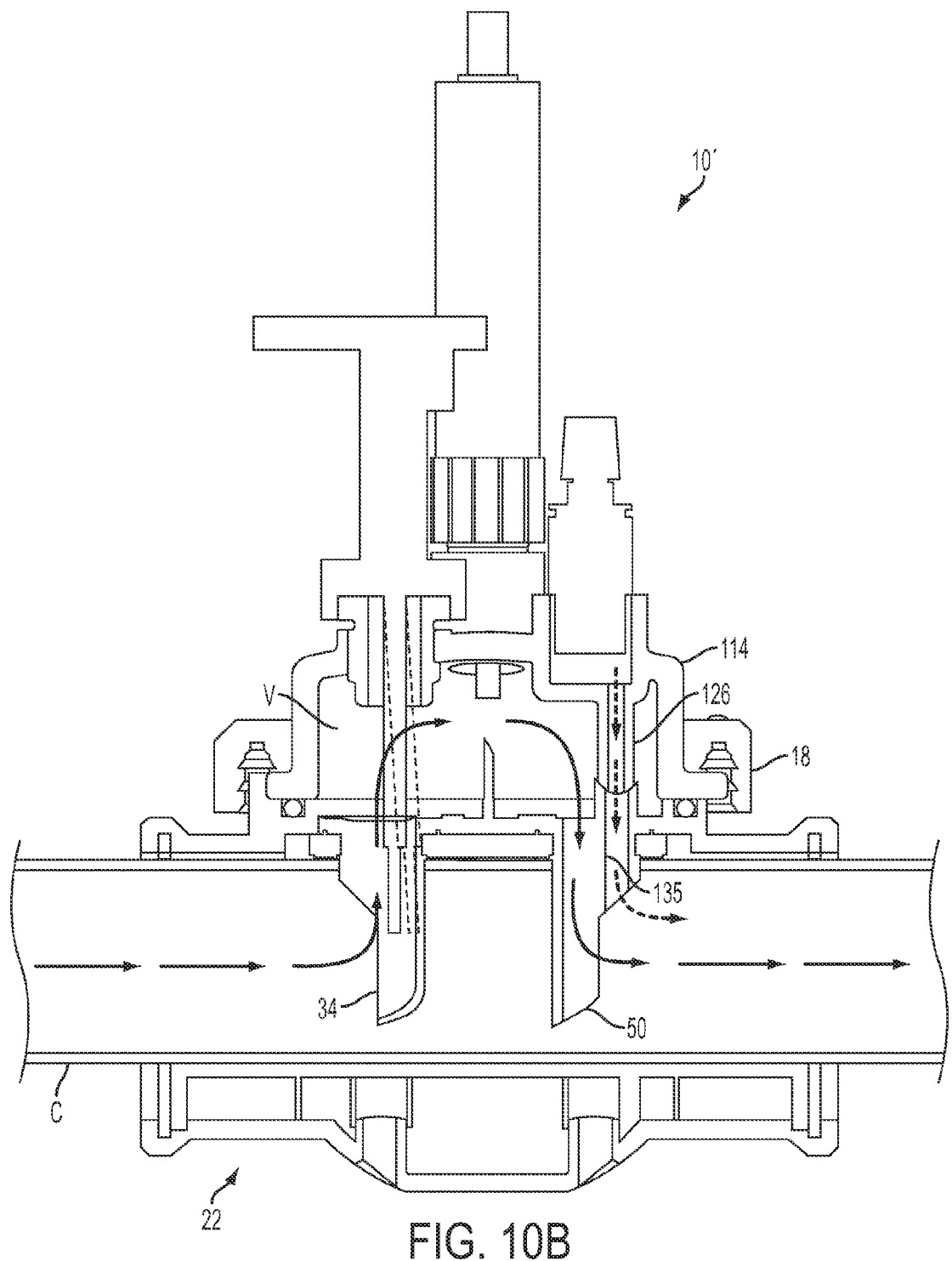
FIGS. 10B-C are cross-sectional views of a variant of the equipment of FIG. 10A.
Figure 10C:
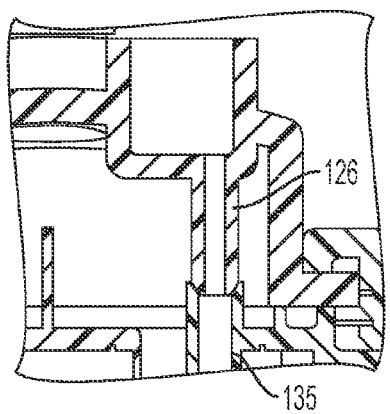

FIGS. 10B-C depict a presently-preferred variant of equipment 10' of the invention. Included as part of caddy 114 is weeping tube, or breather outflow (or feeder) port 135, with which tube 126 communicates. Feeder port 135 may be near or adjacent, but preferably is isolated from (and thus does not communicate with), outlet 50. Separation of port 135 and outlet 50 reduces the possibility that acid or other chemicals injected via tube 126 and port 135 would affect water in volume V. When not being utilized to supply acid to the water in conduit C, port 135 also may function to bleed air from the conduit C in some circumstances.

Figure 11A:
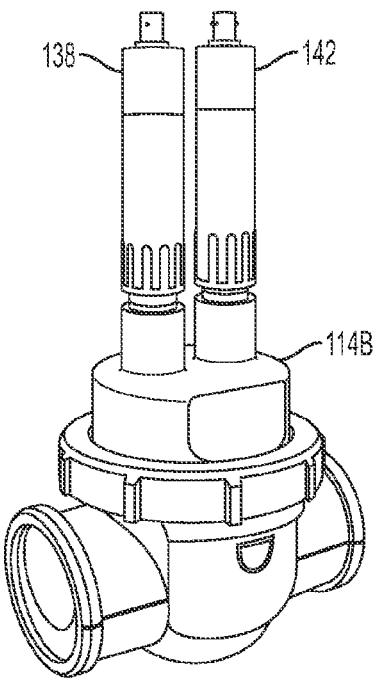
FIGS. 11A-C are perspective views of equipment consistent with FIG. 6 showing aspects of an acid feeder, a flow sensor, and other sensors.
Figure 11B:
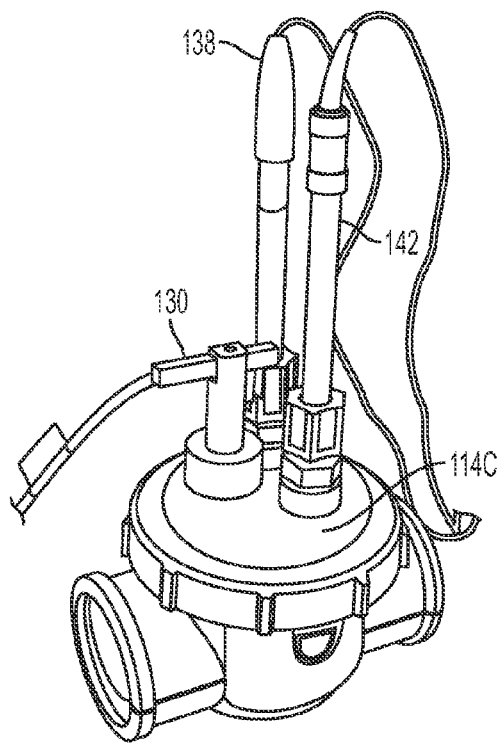
Figure 11C:
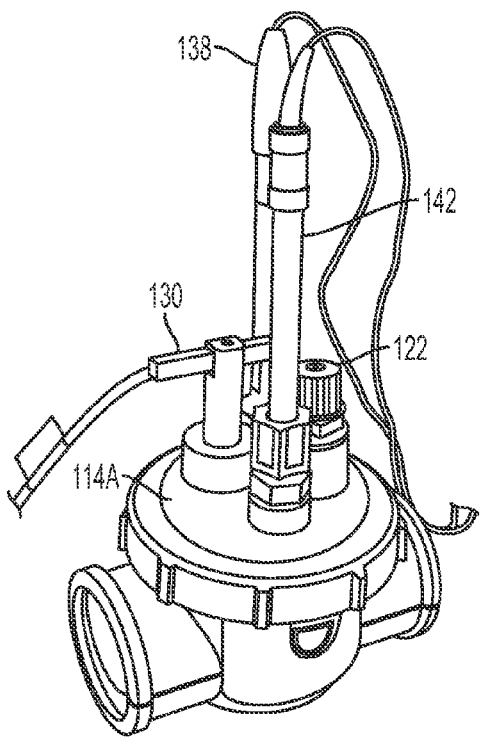

FIGS. 11A-C, finally, illustrate various non-limiting options available for configuring equipment 10'. In FIG. 11A, for example, caddy 114B is employed to allow water from conduit C to communicate with sensors 138 and 142. These sensors 138 and 142, if present, may provide information relating to ORP, pH, salt concentration, cyanuric acid concentration, total alkalinity, chlorine level, temperature, pressure, flow rate, turbidity, or other characteristics of the water. FIG. 11B depicts caddy 114C together with sensors 138 and 142 and flow sensor 130, while FIG. 11C shows caddy 114A together with sensors 138 and 142, flow sensor 130, and feeder 122.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An assembly for diverting liquid flowing at a first rate through a conduit, the assembly comprising:
   a. a housing (i) defining a volume of substantially greater width than height and (ii) comprising a feeder port and a liquid flow obstruction;
   b. an inlet of fixed size (i) proximate the liquid flow obstruction and (ii) configured, in use, to permit liquid to flow from the conduit into the housing so as to effect the diversion;
   c. an outlet configured, in use, to permit liquid to flow from the housing to return to the conduit, the volume defined by the housing forming part of a low-flow region in which the diverted liquid flows at a rate less than the first rate;
   d. a chemical feeder communicating with the feeder port;
   e. a first port; and
   f. a flow sensor communicating with the first port.

2. An assembly for diverting liquid flowing at a first rate through a conduit, the assembly comprising:
   a. a housing (i) defining a volume of substantially greater width than height and (ii) comprising a feeder port and a liquid flow obstruction;
   b. an inlet configured, in use, to permit liquid to flow from the conduit into the housing so as to effect the diversion;
   c. an outlet configured, in use, to permit liquid to flow from the housing to return to the conduit, the volume defined by the housing forming part of a low-flow region in which the diverted liquid flows at a rate less than the first rate;
   d. a chemical feeder communicating with the feeder port;
   e. a first port; and
   f. a flow sensor communicating with the first port; and in which at east a portion of the flow sensor extends within the inlet.

3. An assembly according to claim 2 in which the flow sensor comprises a pivoting arm.

4. An assembly according to claim 3 in which the pivoting arm is within the inlet.

5. A method of diverting liquid flowing at a first rate through a conduit, comprising:
   a. providing a housing (i) defining a volume of substantially greater width than height, (ii) having an exterior surface, and (iii) comprising (A) a feeder port that extends to the exterior surface so as to be accessible externally of the housing and (B) a liquid flow obstruction;
   b. causing liquid to flow from the conduit through an inlet, of fixed size and proximate the liquid flow obstruction, into the housing so as to effect the diversion;
   c. permitting liquid to flow from the housing through an outlet to return to the conduit, the volume defined by the housing forming part of a low-flow region in which the diverted liquid flows at a rate less than the first rate; and
   d. attaching a chemical feeder to the feeder port.

6. An assembly for diverting liquid flowing at a first rate through a conduit, the assembly comprising:
   a. a housing (i) defining a volume of substantially greater width than height, (ii) having an exterior surface, and (iii) comprising (A) a feeder port that extends to the exterior surface so as to be accessible externally of the housing and (B) a liquid flow obstruction;
   b. an inlet of fixed size (i) proximate the liquid flow obstruction an (ii) configured, in use, to permit liquid to flow from the conduit into the housing so as to effect the diversion;
   c. an outlet configured, in use, to permit liquid, to flow from the housing to return to the conduit, the volume defined by the housing forming part of a low-flow region in which the diverted liquid flows at a rate less than the first rate; and
   d. a chemical feeder communicating with the feeder port.

* * * * *